No. 788,642. PATENTED MAY 2, 1905.
H. L. HAPPER.
COVER FOR TEA KETTLES.
APPLICATION FILED NOV. 27, 1903.
2 SHEETS—SHEET 1.
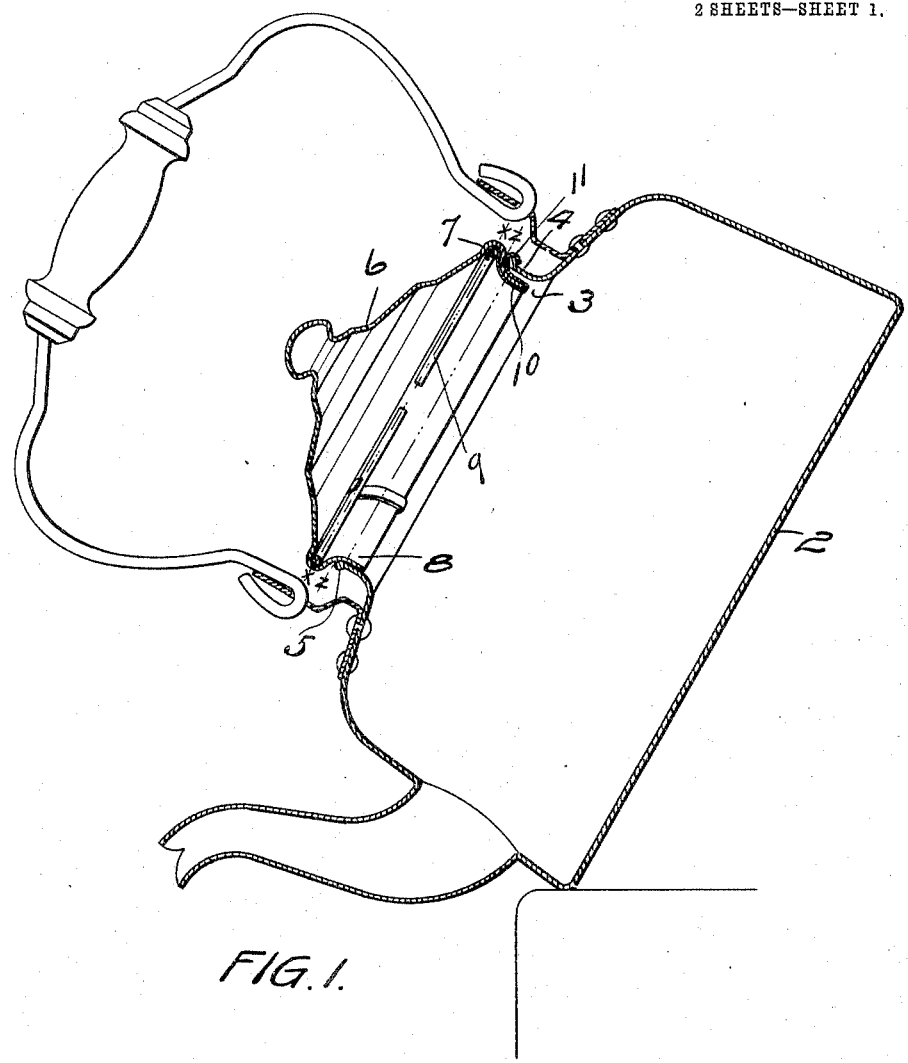
FIG.1.
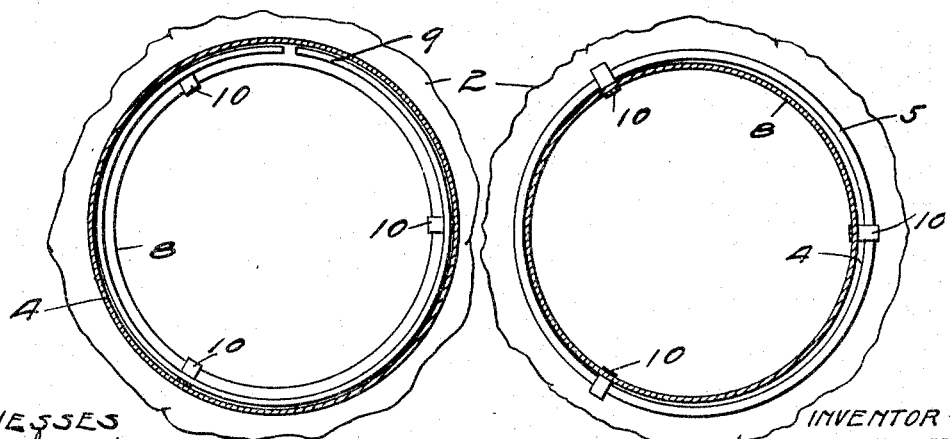
WITNESSES
M. M. Innis
M. Hagerty
FIG.2.
X—X
FIG.3.
Z—Z
INVENTOR
HERVEY L. HAPPER
BY Paul & Paul
HIS ATTORNEYS No. 788,642. PATENTED MAY 2, 1905.
H. L. HAPPER.
COVER FOR TEA KETTLES.
APPLICATION FILED NOV. 27, 1903.

2 SHEETS—SHEET 2.

y-y m-m

WITNESSES
M. McInnis
M. Hagerty

INVENTOR
HERVEY L. HAPPER
BY Paul & Paul
HIS ATTORNEYS

No. 788,642. Patented May 2, 1905.

UNITED STATES PATENT OFFICE.

HERVEY L. HAPPER, OF MINNEAPOLIS, MINNESOTA.

COVER FOR TEA-KETTLES.

SPECIFICATION forming part of Letters Patent No. 788,642, dated May 2, 1905.

Application filed November 27, 1903. Serial No. 182,837.

*To all whom it may concern:*

Be it known that I, HERVEY L. HAPPER, of Minneapolis, Hennepin county, Minnesota, have invented certain new and useful Improvements in Covers for Tea-Kettles, of which the following is a specification.

My invention relates to tin and enameled ware; and the object of the invention is to provide means to prevent the cover of a tea-kettle, coffee or tea pot, or a similar vessel from falling off when the vessel is tilted to pour out its contents.

A further object is to provide a cover-fastening means designed particularly for use on enameled ware, which will allow the cover to be easily put on the vessel and as readily removed therefrom without scratching or scraping off the enamel around the opening in the vessel.

Other objects of the invention will appear from the following detailed description.

The invention consists generally in various constructions and combinations, all as hereinafter described, and particularly pointed out in the claims.

Figure 4:
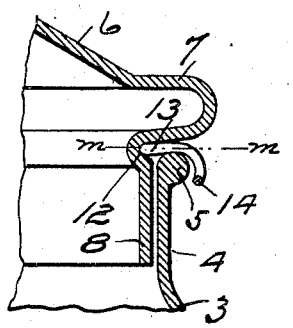
Figure 6:
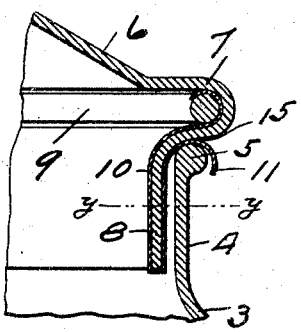
Figure 8:
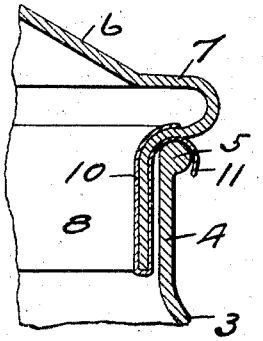
Figure 7:
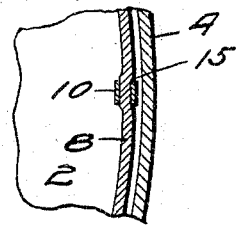
Figure 9:
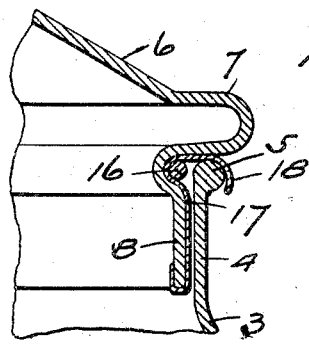
Figure 10:
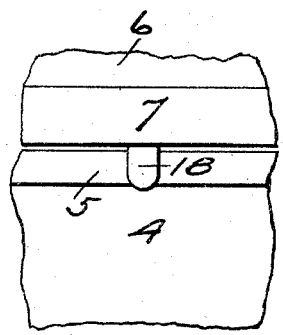
Figure 11:
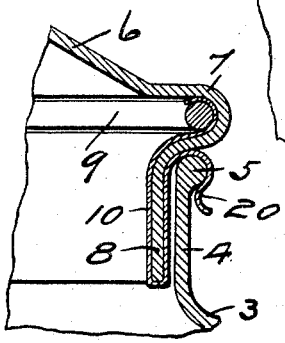
Figure 5:
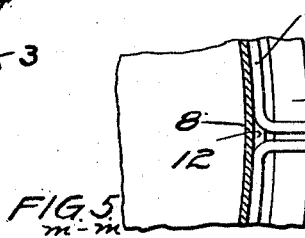
Figure 12:
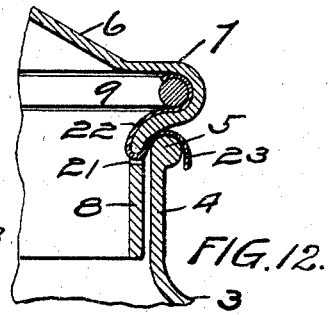

In the accompanying drawings, forming part of the specification, Figure 1 is a vertical section of a tea-kettle with my invention applied thereto. Fig. 2 is a section on the line $x\ x$ of Fig. 1. Fig. 3 is a section on the line $z\ z$ of Fig. 1. Fig. 4 is a detail sectional view showing a modified means for holding the cover in place on the vessel. Fig. 5 is a section on the line $m\ m$ of Fig. 4. Fig. 6 is a detail section showing still another modification of construction. Fig. 7 is a sectional view on the line $y\ y$ of Fig. 6. Fig. 8 is a detail section showing a modification of the fastening means. Fig. 9 is a similar view showing still another modification. Fig. 10 is an outside view looking toward the side of the vessel with the cover in place thereon. Figs. 11 and 12 illustrate different ways in which the locking hooks or arms may be secured to the cover.

In the drawings, 2 represents a tea-kettle of the ordinary type, having an opening 3 in its top surrounded by the usual flange 4, terminating at its upper edge in a bead 5.

6 is a cover having an edge 7, adapted to rest upon the top of the flange 4, and an inwardly-turned depending flange 8, that fits within the opening 3. This is the usual way of making a tea-kettle, and in enameled ware the cover fits loosely within the vessel-opening, and there is nothing to prevent its falling off when the vessel is tilted to pour out its contents.

Various devices have been provided for holding the cover of an enameled vessel in place; but they are usually objectionable, owing to the fact that the fastening devices engage the inside surface of the flange 4 and tend to scratch and break the enamel, allowing it to fall down into the vessel and subsequently to become mixed with the food or drink. To obviate this objection and to provide a fastening that will absolutely prevent the cover from falling off the vessel when it is tilted, I provide a spring 9, circular in form and adapted to slip into the recess on the inside of the cover above the flange 8 thereon. This spring carries a series of metal clips 10, that are hooked around the spring and bent down around the lower edge of the flange 8 and are provided with hooks 11, that project out over the upper edge of the flange 4, and when the vessel is tilted and the cover slides to the lower side of the opening the hooks on the upper side of said opening will engage the bead 5 and prevent the cover from falling off even if the vessel is tilted to an extreme degree.

With this device a person can handle a tea-kettle and coffee or tea pot without any danger of being burned by the accidental falling off of the cover.

The cover of an enameled-ware tea-kettle sets loosely over the opening, and the hooks when the kettle is in a horizontal position do not contact with the bead 5 and will allow the steam in the kettle to raise the cover sufficiently to relieve the pressure and prevent any possibility of the boiling water being forced out through the kettle-spout.

In Figs. 4 and 5 I have shown a modification which consists in providing an annular groove 12 in the depending flange 8 and arranging therein a ring 13, preferably of spring-wire, having at intervals thereon a series of integrally-formed clips 14, which extend out over the top of the flange 4 and have the same functions as the hooks 11.

In Figs. 6 and 7 I have shown an enlarged view of the illustrations of fasteners shown in Figs. 1, 2, and 3, excepting that I have provided depressions 15 in the flange 8 to receive the clips 10 and allow the cover to drop nearly down upon the top of the vessel.

In Fig. 9 I have shown a ring 16 provided within an annular groove similar to the one shown in Fig. 4, and upon said ring I provide clips 17, that are extended down outside and around the lower edge of the flange 8 and have outwardly-extending arms or hooks 18, that overhang the flange 4 and engage the same when the vessel is tilted.

In Fig. 11 a clip similar to the one shown in Fig. 6 is provided, except that it has a curved depending end 20, that fits snugly under the bead 5 and gripping the same holds the cover securely in place on the vessel. This end springs back and forth as the cover is placed on the vessel or removed.

In Fig. 12 a hole 21 is provided in the flange 8, adapted to receive a clip 22, that is held in place at its upper end by the spring 9 and has an outwardly-projecting end 23, that overhangs the flange 4. Various other ways may be devised for attaching these hooks to the vessel-cover, and I do not, therefore, wish to be confined to the particular means shown herein, though I regard the various modifications as the preferred manner of securing the hooks.

While the fastening devices are designed particularly for enameled-ware vessels, they are equally well adapted for tinware, but will probably be used more extensively on the former, as covers on enameled-ware tea-kettles fit loosely thereon and it is desirable to provide a fastening means that will not scratch or break the enamel.

I claim as my invention—

1. The combination, of a vessel having an opening in its top and a vertical flange provided with a beaded edge extending around said opening, with a cover having a depending flange fitting loosely within said opening, and clips detachably mounted on said cover and having downwardly-turned ends arranged to overhang said vessel-flange and extend down around the outside of said beaded edge and engage the same when said vessel and cover are tilted, substantially as described.

2. The combination, with a vessel having an opening in its top and a flange extending around said opening, of a cover adapted to rest upon said vessel-flange and having a depending flange fitting loosely within said opening, and a series of metallic clips detachably arranged at intervals on said cover-flange and having ends that extend downwardly outside of said vessel-flange and adapted to engage the same and hold said cover in place when the vessel is tilted, for the purpose specified.

3. The combination, with an enameled-ware tea-kettle having an opening in its top and a vertical flange extending thereabout, of a cover having a depending flange fitting within said opening, a spring-ring provided within said cover, clips arranged upon said ring at intervals and having arms projecting out over the upper edge of said vessel-flange and adapted to engage the same when the vessel is tilted.

4. The combination, with a vessel having an opening in its top and a beaded flange extending around said opening, of a cover adapted to rest upon said flange, a spring-clip provided on said cover and having a depending end extending outside of said vessel-flange and down around said bead and adapted to engage the same when the vessel is tilted.

In witness whereof I have hereunto set my hand this 4th day of November, A. D. 1903.

HERVEY L. HAPPER.

In presence of—
RICHARD PAUL,
M. HAGERTY.